(12) United States Patent
Pallemulle et al.

(10) Patent No.: US 9,723,053 B1
(45) Date of Patent: Aug. 1, 2017

(54) PRE-FETCHING A CACHEABLE NETWORK RESOURCE BASED ON A TIME-TO-LIVE VALUE

(71) Applicant: Amazon Technologies, Inc., Reno, NV (US)

(72) Inventors: Sajeeva Lakmal Bandara Pallemulle, Woodinville, WA (US); Amit Santosh Jain, Seattle, WA (US); Dhruva Lakshmana Rao Batni, Seattle, WA (US); Kai Yi Li, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 713 days.

(21) Appl. No.: 14/015,905

(22) Filed: Aug. 30, 2013

(51) Int. Cl.
*G06F 13/00* (2006.01)
*H04L 29/08* (2006.01)

(52) U.S. Cl.
CPC ............................... *H04L 67/02* (2013.01)

(58) Field of Classification Search
CPC ............ H04L 29/08072; H04L 29/06; H04L 29/0809; H04L 29/08981; H04L 29/08117; H04L 67/02; G06Q 30/02; G06Q 10/10; G06F 17/3089; G06F 17/30899; G06F 17/30972
USPC ....................................................... 709/217
See application file for complete search history.

(56) References Cited

U.S. PATENT DOCUMENTS

| | | | | |
|---|---|---|---|---|
| 6,038,601 A | * | 3/2000 | Lambert et al. | 709/226 |
| 6,604,103 B1 | * | 8/2003 | Wolfe | G06F 17/30306 |
| 7,146,416 B1 | * | 12/2006 | Yoo et al. | 709/224 |
| 7,565,423 B1 | * | 7/2009 | Fredricksen | 709/223 |
| 8,136,089 B2 | | 3/2012 | Snodgrass et al. | |
| 2005/0071741 A1 | * | 3/2005 | Acharya et al. | 715/500 |
| 2011/0282869 A1 | * | 11/2011 | Zhilyaev et al. | 707/723 |
| 2012/0303606 A1 | * | 11/2012 | Cai et al. | 707/709 |

OTHER PUBLICATIONS

U.S. Appl. No. 14/015,905—NPL—High Performance Networking in Google Chrome; by Ilya Grigorik on Jan. 31, 2013—https://www.igvita.com/posa/high-performance-networking-in-google-chrome/.*
Belshe, M. (Feb. 10, 2011). "The Era of Browser Preconnect." Retrieved from www.belshe.com/2011/02/10/the-era-of-browser-preconnect/.
Grigorik, I. (Jan. 31, 2013). "High Performance Networking in Google Chrome." Retrieved from http://www.igvita.com.

* cited by examiner

*Primary Examiner* — Robert B Harrell
(74) *Attorney, Agent, or Firm* — Knobbe, Martens, Olson & Bear, LLP

(57) ABSTRACT

A system is disclosed that generates page profiles for network pages based on aggregated usage data. The page profile for a given page may, for example, include information regarding specific page generation tasks (e.g., resource requests) that are frequently executed by browsers when the page is loaded. The page profiles may be used by browsers or an intermediary system to preemptively perform selected page generation tasks, thereby reducing perceived page load times.

24 Claims, 6 Drawing Sheets

```
600

{
  "url": "http://www.examplenetworkpage.com/",
  "acceleratedLinks": {
    "nextPagePredictions": {
      "http://www.examplenetworkpage.com/page3": {        602
        "hitProbability": 0.9
      }
    },
    "timestamp": 1371528000000      608
  },
  "orderedResourceList": {
    "resources": [
      {
        "url": "http://images-examplenetworkpage.com/images/G/01/browser-scripts/
examplenetworkpage/examplenetworkpage-1466453065._V1_.js",
        "clientCacheable": true,
        "accessControlled": false,                        604
        "secureResource": false,
        "proxyCacheable": true
      },
    ],
    "timestamp": 1371596482854      608
  },
  "subDomains": {
    "subDomainProfiles": {
      "s.examplenetworkpage-adsystem.com:80": {
        "nonCachableResourceCount": 1,
        "cachableResourceCount": 1,
        "preconnectScheme": "http://"
      },
      "images-examplenetworkpage.com:80": {               606
        "nonCachableResourceCount": 0,
        "cachableResourceCount": 45,
        "preconnectScheme": "http://"
      },
    },
    "timestamp": 1371595822859      608
  }
}
```

FIG. 6

PRE-FETCHING A CACHEABLE NETWORK RESOURCE BASED ON A TIME-TO-LIVE VALUE

BACKGROUND

Computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

In some cases, the client computing device may communicate with the content provider through a proxy service. The proxy service, which may be hosted by a proxy server, may provide an intermediary service between the content provider and the client computing device. The use of the proxy service can result in a number of benefits including anonymity, auditing, data loss prevention, and to implement access policies.

Some browsers and proxy services implement features for reducing page load times as perceived by end users. For example, some browsers and some proxy services predictively pre-fetch and cache content, and some browsers predictively pre-connect to web servers in anticipation of content requests. While these features are useful, additional reductions in perceived page load times would benefit both users and content providers.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIG. 6 presents an embodiment of a network page profile.

DETAILED DESCRIPTION

Introduction

In addition to the aforementioned uses, a proxy service, or other intermediary system, may be used to speed up access to a network page (e.g., a webpage) by performing pre-processing of the network page, or portions thereof, based at least partially on a network page profile. Alternatively, or in addition, the network page profile associated with a network page accessed by a user may be used to perform pre-processing of another network page that a user is expected to access with some degree of probability. The network page profile may be generated based on analyzing the usage patterns of other users who accessed the network page over some time period.

Certain embodiments of systems and methods are disclosed for generating a network page profile associated with a network page. The page profile for a given page may be based on aggregated usage data reflective of the page generation tasks performed by many user computing devices that have accessed the page. Such usage data may be collected or reported by browsers, by one or more proxy services, or both. Further, systems and methods are presented herein for pre-processing the network page or associated network pages based on the network page profile. Pre-processing of a network page may include pre-resolving domain names and/or pre-connecting to network systems hosting network pages and/or resources. Further, pre-processing of a network page may include pre-fetching resources for the network page or a network page a user is likely to access based on the access history of others users who accessed the network page. Moreover, pre-processing of a network page may include any other type of pre-processing that may speed up access to a network page or associated resource compared to traditional network page access systems, or compared to a system not using the systems and/or methods disclosed herein.

The systems and methods disclosed herein may be implemented by an intermediary system, such as a proxy server, accessed by a user in attempting to access a network page hosted by a content provider system. The intermediary system may be used to perform split-browsing or cloud-based browsing of network pages in a content delivery environment. Alternatively, or in addition, the systems and methods presented herein may be implemented without a proxy service or other intermediary system; for example, they may be used for browsing, or accessing, network pages in non-split browsing or off-cloud browsing embodiments of a content delivery environment. In some such cases, the systems and methods presented herein may be implemented by a browser or other application located on a user computing system. Further, the systems and methods presented herein may be implemented by a special, or application-specific, browser or component. In other cases, the systems and methods may be implemented by a traditional browser using, for example, a plug-in.

Example Content Delivery Network

Figure 1:
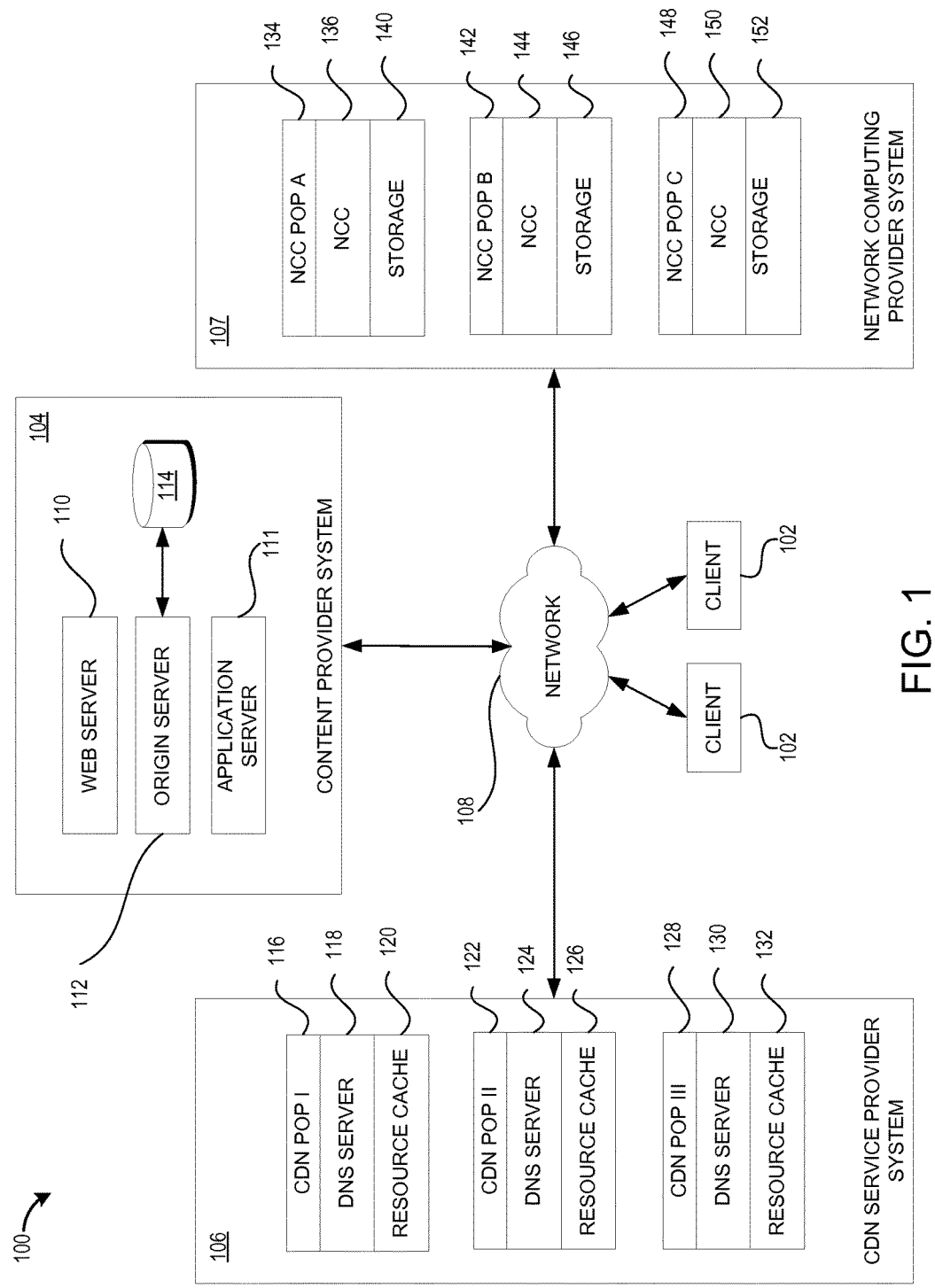
FIG. 1 illustrates an embodiment of a networked computing environment including a number of client computing devices, a content provider, a content delivery network service provider, and a network computing provider.

FIG. 1 illustrates an embodiment of a content delivery environment or a networked computing environment 100 configured to provide access to content. The network computing environment 100 can include a number of client computing devices 102. Further, although only one of each is illustrated, the networked computing environment 100 can include one or more content provider systems 104, one or more content delivery network ("CDN"), or content distribution network, service provider systems 106, and one or more network computing provider systems 107.

As illustrated in FIG. 1, the networked computing environment 100 includes a number of client computing devices 102 (generally referred to as clients) for requesting content and content processing from a content provider system 104, CDN service provider system 106, or network computing provider system 107. In an illustrative embodiment, the client computing devices 102 can correspond to a wide variety of computing devices including personal computing devices, laptop computing devices, hand-held computing devices, terminal computing devices, mobile devices (e.g., mobile phones, smart phones, tablet computing devices, etc.), wireless devices, various electronic devices and appliances, video game systems, kiosks, and the like. In an illustrative embodiment, the client computing devices 102 include hardware and software components for establishing communications over a communication network 108. For example, the client computing devices 102 may be equipped with networking equipment and browser software applications that facilitate communications via a network (e.g., the Internet) or an intranet. The client computing devices 102 may have varied local computing resources such as central processing units and architectures, memory, mass storage, graphics processing units, communication network availability and bandwidth, etc. Although termed "client" computing devices, the client computing devices 102 can include any type of user computing device and is not limited to a client device of a client/server architecture.

The network 108 can include any type of communication network. For example, the network 108 can include one or more of a wide area network (WAN), a local area network (LAN), a cellular network, an ad hoc network, a satellite network, a wired network, a wireless network, etc. Further, in some cases, the network 108 can include the Internet.

The networked computing environment 100 can also include a content provider system 104 in communication with the one or more client computing devices 102 or other service providers (e.g., CDN service provider system 106, network computing provider system 107, etc.) via the communication network 108. The content provider system 104 illustrated in FIG. 1 may correspond to a logical association of one or more computing devices associated with a content provider entity. Specifically, the content provider system 104 can include a web server component 110 corresponding to one or more server computing devices for obtaining and processing requests for content (such as Web pages) from the client computing devices 102 or other service providers. The content provider system 104 can further include an origin server component 112 and associated storage component 114 corresponding to one or more computing devices for obtaining and processing requests for network resources from the CDN service provider system 106. The content provider system 104 can still further include an application server computing device 111, such as a data streaming server, for processing streaming content requests. One skilled in the relevant art will appreciate that the content provider system 104 can be associated with various additional computing resources, such as additional computing devices for administration of content and resources, domain name system ("DNS") name servers, and the like. For example, although not illustrated in FIG. 1, the content provider system 104 can be associated with one or more DNS name server components that would be authoritative to resolve client computing device DNS queries corresponding to a domain of the content provider. Further, although termed "server" computing devices, the web server 110, origin server 112, and application server 111 can include any type of computing devices for providing access to a network resource and are not limited to servers of a client/server architecture.

With continued reference to FIG. 1, the networked computing environment 100 can further include a CDN service provider system 106 in communication with the one or more client computing devices 102 and other service providers via the communication network 108. The CDN service provider system 106 illustrated in FIG. 1 may correspond to a logical association of one or more computing devices associated with a CDN service provider entity. Specifically, the CDN service provider system 106 can include a number of Point of Presence ("POP") locations 116, 122, 128 that correspond to nodes on the communication network 108. In some cases, the CDN POP locations 116, 122, and 128 may be geographically disparate. For example, the CDN POP 116 may correspond to a CDN located in New York, the CDN POP 122 may correspond to a CDN located in California, and the CDN POP 128 may correspond to a CDN located in London.

Each CDN, located at the CDN POPs 116, 122, 128, may include a DNS component 118, 124, 130 made up of a number of DNS server computing devices for resolving DNS queries from the client computers 102 or other computing systems (e.g., the NCCs 136, 144, 150). Each CDN, located at the CDN POPs 116, 122, 128, may also include a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider system 106, the CDN POPs will be geographically distributed throughout the communication network 108 in a manner to best serve various demographics of client computing devices 102. Additionally, one skilled in the relevant art will appreciate that the CDN service provider system 106 can be associated with various additional computing resources, such as additional computing devices for administration of content and resources, and the like.

With further continued reference to FIG. 1, the networked computing environment 100 can also include a network computing provider system 107 in communication with the one or more client computing devices 102, the CDN service provider system 106, and the content provider system 104 via the communication network 108. The network computing provider system 107 illustrated in FIG. 1 may correspond to a logical association of one or more computing devices associated with a network computing provider entity. Specifically, the network computing provider system 107 can include a number of Point of Presence ("POP") locations 134, 142, 148 that correspond to nodes on the communication network 108. In some cases, the POP locations 134, 142, and 148 may be geographically disparate. For example, the POP 134 may correspond to a node located in New York, the POP 142 may correspond to a node located in California, and the POP 148 may correspond to a node located in London.

Each POP 134, 142, 148 may include one or more network computing components (NCCs) 136, 144, 150 for hosting applications, such as data streaming applications, via a number of instances of a virtual machine, generally referred to as an instance of an NCC. In some cases, the NCCs 136, 144, 150 may provide access to physical resources (e.g., storage, processors, etc.). Further, the NCCs 136, 144, 150 may provide access to network pages (e.g., webpages) and/or other network resources that may be hosted by the content provider system 104.

One skilled in the relevant art will appreciate that NCC 136, 144, 150 can include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own.

Each NCC POP 134, 142, 148 may also include one or more storage components 140, 146, 152 made up of a number of storage devices for storing any type of data used in the delivery and processing of network or computing resources, including but not limited to user data, state information, processing requirements, historical usage data, and resources from content providers that can be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS name server to facilitate request routing. In some embodiments, the storage components 140, 146, 152 may be included as part of the NCCs 136, 144, 150 respectively. As will be described further with reference to FIG. 2, the NCC POPs 134, 142, 148 may include additional systems for providing client computing devices 102 with improved access to network pages and associated network resources.

In an illustrative embodiment, NCCs 136, 144, 150 and the storage components 140, 146, 152 are considered to be logically grouped, regardless of whether the components, or portions of the components, are physically separate. For example, a network computing provider system 107 may maintain separate POPs for providing the NCC and the storage components. Additionally, although the NCC POPs 134, 142, 148 are illustrated in FIG. 1 as logically associated with a network computing provider system 107, the NCC POPs may be geographically distributed throughout the communication network 108 in a manner to best serve various demographics of client computing devices 102. Additionally, one skilled in the relevant art will appreciate that the network computing provider system 107 can be associated with various additional computing resources, such as additional computing devices for administration of content and resources, and the like. Even further, one skilled in the relevant art will appreciate that the components of the network computing provider system 107 and components of the CDN service provider system 106 can be managed by the same or different entities.

Although FIG. 1 illustrates one content provider system 104, one CDN service provider system 106, and one network computing provider system 107, the networked computing environment 100 is not limited as such. The networked computing environment 100 may include a plurality of content providers 104, CDN service providers 106, and/or network computing providers 107. Further, each of the content providers 104, CDN service providers 106 and/or network computing providers 107 may be associated with different entities.

Second Example Content Delivery Network

Figure 2:
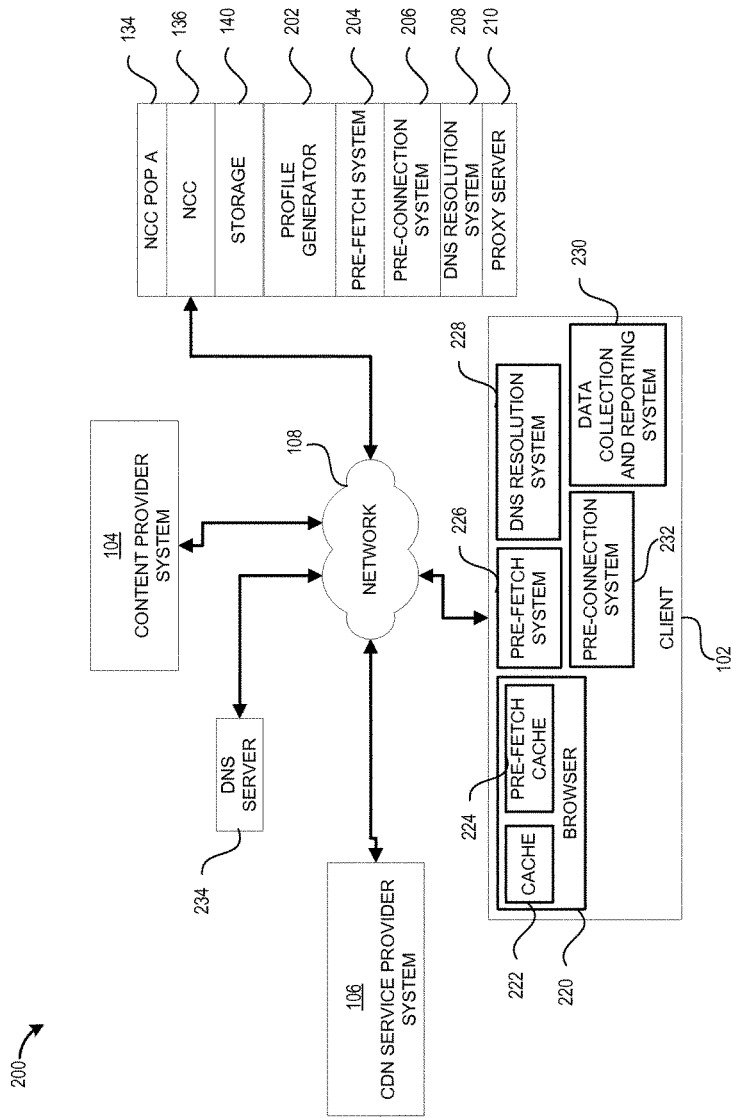
FIG. 2 illustrates another embodiment of the networked computing environment.

FIG. 2 illustrates another embodiment of the networked computing environment 200. In addition to the previously described systems with respect to the networked computing environment 100, the networked computing environment 200 may include one or more DNS servers 234. The DNS servers 234 can include any system for resolving domain names. Further, the NCC POP 134 may include a number of additional systems or components including a profile generator 202, a pre-fetch system 204, a pre-connection system 206, a DNS resolution system 208, and a proxy server 210. Each of these aforementioned systems may be separate systems including one or more processors. Alternatively, at least some of the profile generator 202, the pre-fetch system 204, the pre-connection system 206, the DNS resolution system 208, and the proxy server 210 may be included with the NCC 136, as either hardware or software.

The profile generator 202 can include any system for generating a network page profile associated with a network page. The network page profile can include information relating to a probability or likelihood that a user who accesses the network page will also access a number of resources, domains, or additional network pages. This information may be determined based on usage information for a number of users who accessed the network page. Generating the network page profile is described in more detail with respect to FIGS. 3 and 4.

The pre-fetch system 204 can include any system that can access resources associated with a network page. The pre-fetch system 204 may access resources identified in a network page profile generated by the profile generator 202 or received from a content provider system 104. Further, the pre-fetch system 204 may store the resources at a repository, such as the storage 140, or at a cache, such as the pre-fetch cache 224.

The pre-connection system 206 can include any system that can establish a communication connection with another computing system. Further, the pre-connection system 206 may establish a communication connection with one or more systems referenced in the network page profile. The communication connection may be any type of connection that enables two computing systems to communicate over the network 108. For example, the communication connection may be a transmission control protocol (TCP) connection, a TCP/IP connection, a wireless connection, a wired connection, etc.

The DNS resolution system 208 can include any system that can resolve a domain name referenced in a network page. The DNS resolution system 208 may access domain names identified in the network page profile and resolve the accessed domain names. In some cases, the DNS resolution system 208 may resolve the domain names by providing the domain names to the DNS server 234 to resolve. Resolving the domain name may include determining a network address associated with a domain name for a content site or network computing system. The network address may include an IP address or other address for locating a computing system within the network 108.

The proxy server 210 can include any system that can provide a proxy service. Further, the proxy server 210 can include any type of proxy service. For example, the proxy service can include a forward proxy, an open proxy, a reverse proxy, a performance enhancing proxy (PEP), etc.

Although many of the processes are described herein as being performed by the NCC 136 and its associated systems, the present disclosure is not limited as such. For instance, it is possible for systems of the NCC 136 to be located at a content provider system 104 enabling the content provider system 104 to perform the processes described herein. For example, the profile generator 202 may be located at the content provider system 104 and it is possible for the content provider system 104 to generate a network page profile for one or more network pages hosted by the content provider system 104.

Further, it is possible for a number of the processes described herein to be performed by systems located at a user computing system (e.g., the client 102). For example, the client 102 may include a pre-fetch system 226, a DNS resolution system 208, and a pre-connection system 232. The pre-fetch system 226, the pre-connection system 232, and the DNS resolution system 228 can include some or all of the embodiments of the pre-fetch system 204, the pre-connection system 206, and the DNS resolution system 208, respectively. Thus, for example, the pre-fetch system 226 can access a network page profile associated with a network page and access or obtain a copy of a resource referenced in the network page profile. The pre-fetch system 226 can store the copy of the resource at the pre-fetch cache 224.

In addition, the client 102 can include one or more applications for accessing a network page. For example, the client 102 can include a browser 220, mobile application, or any other type of application that can access a network page. The client 102 may also include a cache 222, which may be a separate memory or system, or part of the browser 220, as illustrated. The cache 222 may be configured to store data associated with accessing a network page including, for example, the network page itself, resources associated with the network page, configuration information for the browser 220, etc. In some embodiments, pre-fetched resources, pre-rendered network pages, and/or data associated with domain name resolution and pre-connections to domains may be stored at the cache 222. Alternatively, or in addition, the browser 220 may include a pre-fetch cache 224 that may be configured to store pre-fetched resources, pre-rendered network pages, and/or data associated with domain name resolution and pre-connections to domains.

In some embodiments, the client 102 may also include a data collection and reporting system 230. The data collection and reporting system 230 can include any system that can analyze a user's access of network pages and identify one or more metrics related to the user's access of the network pages. The information obtained from monitoring the user's access of network pages may be provided to the profile generator 202 to facilitate with creation of the network page profiles. The profile generator 202 may aggregate usage information from a number of users or accesses to the network pages to create the network page profiles. Alternatively, or in addition, the information may be used by the data collection and reporting system 230 or provided to the browser 220 to create network page profiles. In some such cases, the network page profiles may be based on a single user's browse history and/or only on the browser history of users who use the client 102 to access network pages.

Example Profile Generation Process

Figure 3:
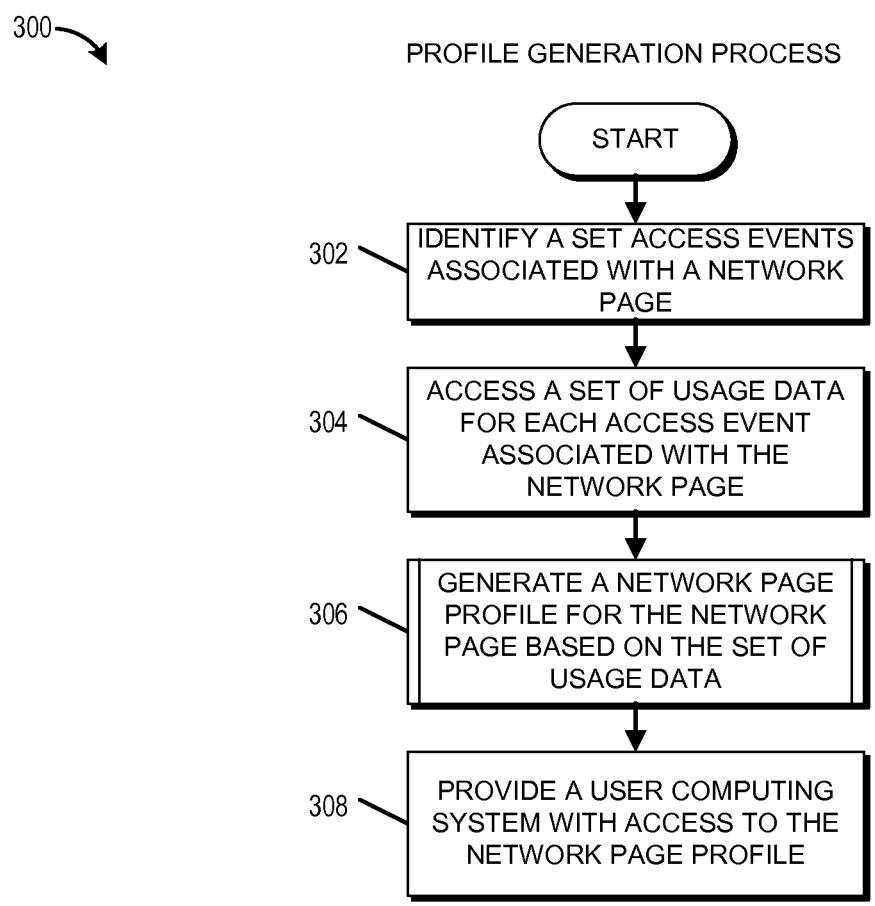
FIG. 3 presents a flowchart of an embodiment of a profile generation process.

FIG. 3 presents a flowchart of an embodiment of a profile generation process 300. The process 300 can be implemented by any system that can generate a network page profile for a network page. For example, the process 300, in whole or in part, can be implemented by a network computing component (e.g., the NCC 136), a profile generator 202, a data collection and reporting system 230, a browser 220, and the proxy server 208, to name a few. Although any number of systems, in whole or in part, can implement the process 300, to simplify discussion, the process 300 will be described with respect to particular systems.

The process 300 begins at block 302 where, for example, the profile generator 202 identifies a set of access events associated with a network page hosted by the content provider system 104. The access events may include accesses to the network page by one or more users. In some cases, each access event is counted separately. Further, access events may be user agnostic with little to no user-specific data being collected. Thus, if a user accesses the network page ten times, ten access events may be tracked. In other cases, access events may be aggregated or filtered for a particular time period. In some cases, cookies or other identifiers may be used to filter and/or aggregate access events. For example, if a user or a client device 102 accesses the network page ten times in one hour, the profile generator 202 may treat the ten access events as one access event and may aggregate the data from the ten access events. Alternatively, the profile generator may ignore nine of the access events. Continuing the previous example, an access event by the user occurring the next day may be treated as a new access event.

In some cases, the process 300 begins after the number of access events associated with a network page and/or the number of users who have accessed the network page satisfies a threshold, such as 100 access events or 50 users. Further, the threshold may be associated with a time period, such as 100 users in the past day or week. The set of users may be identified from users who access the network page through a proxy service or proxy server, such as the proxy server 210. Alternatively, or in addition, the set of users may be identified based on an application (e.g., the browser 220) or plug-in (not shown) used by a user to access the network page via, for example, the client 102.

In some embodiments, the set of users may be identified or selected based on one or more common characteristics. In such cases, if a threshold is associated with the set of users, the threshold may also be associated with the characteristic, such as 100 users who access the network page who share the identified characteristic. The characteristics can include any characteristic of the users or the user computing devices utilized by the users to access the network page that can be shared among multiple users. For example, the characteristic may relate to geographic location of the users, type of user computing device utilized by the users (e.g., mobile device, desktop, game system, etc.), age range of the users (e.g., above eighteen), connection type to the network 108 (e.g., wired versus wireless or cellular, or Wi-Fi versus 4G), the Internet Service Provider (ISP) utilized by the users, the hardware and/or software configuration of the computing devices utilized by the users, and the like.

In some cases, the set of users may be a single user. Further, in some such cases, the process 300 may be performed at the user's computing device (e.g., the client 102) by, for example, the browser 220 or a local profile generator (not shown).

The process 300, in some cases may require a minimum number of access events or access events over a time period to complete the process. For example, the process 300 may require at least 500 access events a day. In such a case, if 500 access events, or more, are identified at the block 302, the process 300 may continue being performed. However, in this example, if on a particular day less than 500 access events occur, the process 300 may not be performed.

At block 304, the profile generator 202 accesses a set of usage data associated with each access event associated with the network page and/or each user's access of the network page. The usage data can include any data or metadata associated with an access event and/or a user's access of the network page. For example, the usage data can include identifiers of resources accessed during the access event and/or by the user, domains accessed by the user, additional network pages accessed by the user that are linked to the network page, other network pages accessed by the user that may or may not be linked to the network page, and the like.

The usage data may be obtained by the NCC 136 as each user accesses the network page via the NCC 136. For example, the proxy server 210 may monitor network page access by users. Alternatively, or in addition, a special browser or browser component may be used that generates usage data for a user and provides the usage data to the profile generator 202 automatically, or upon request in response to particular usage generation events, such as access of the network page, or activation of a resource on the network page. This special browser or browser component can include the data collection and reporting system 230 and/or a plug-in included with the browser 220.

Resources can include any type of network resource that may be accessed via a network page. For example, resources may include videos, images, JavaScript, CSS, XML, applets, flash, plug-ins, and the like. Further, at least some of the resources may be cacheable. Generally, a resource identified as cacheable may include a resource that the entity associated with the network page does not anticipate modifying for a period of time or does not expect another entity associated with the resource to modify the resource for a period of time. In some cases, the network page may include cacheable resources that have not been identified as cacheable due, for example, to coding errors. Moreover, in some cases, the network page may not include any cacheable resources.

The profile generator 202, at block 306, generates a network page profile for the network page based at least partially on the set of usage data accessed for each user from the set of users. The network page profile may include all resources, domains, and/or additional network pages accessed by the users, or may include a subset thereof that satisfies a threshold of number of percentages of users who accessed the resources, domains and/or additional network pages.

Further, in some embodiments, the network page profile, or portions of the network page profile may be associated with a time-to-live (TTL) value. In some cases, after the time-to-live value has been reached, the process 300 may be repeated to generate a new network profile page for the network page or to update the portion of the network page profile that has expired. The time-to-live value may be based on a number of factors. In some cases, the time-to-live value may depend on whether a resource is determined to be cacheable. Determining whether a resource is cacheable may include accessing a cacheable resource tag, metadata, or indicator associated with a resource. Further, time-to-live values may be specified by a user (e.g., an administrator) associated with the NCC 136 or profile generator 202. Further embodiments of a process associated with generating the network page profile are described in further detail with respect to FIG. 4.

In some embodiments, the process 300 may be performed on a scheduled basis, such as on a daily basis or an hourly basis. Alternatively, or in addition, the process 300 may be performed each time an access event occurs or after a set number of access events. Thus, in certain cases, the network page profile, or portions thereof, may be updated or replaced at some time prior to the TTL value expiring. Further, in some cases, the TTL value may be omitted. Advantageously, in certain embodiments, by updating the network page profile on a timed basis, the network page profile is more accurate than network page profiles that are updated at expiration only. Further, in certain embodiments, by aggregating usage data from access events that may be generated by multiple users, a new user may take advantage of the performance improvements resulting from use of the network page profile despite the new user having not yet generated an access event for the network page. In embodiments where a minimum number of access events are not reached, a previously generated network page profile may be used until the TTL value is reached.

At block 308, the profile generator provides a user computer system (e.g., the client 102) with access to the network page profile. Providing the user computing system with access to the network page profile may include providing a copy of the network page profile to the user computing system. Alternatively, or in addition, providing the user computer system with access to the network page profile may include using the network page profile at the NCC 136 to facilitate accessing the network page via the NCC 136. For example, the proxy server 210 may receive a request from the client 102 to access a network page hosted by the content provider system 104. The NCC 136 may then use the corresponding network page profile to facilitate processing the request received at the proxy server 210 to access the network page. Example embodiments for using the network page profile to facilitate access to the network page are described in more detail below with respect to FIG. 5.

In some embodiments, the network page profile may be stored at the NCC 136. For example, the network page profile may be stored at the storage 140. Alternatively, or in addition, the network page profile may be stored at the user computing system (e.g., the client 102).

As previously indicated, the process 300 may or may not collect user-specific data when access usage data. In some cases, user data is sanitized or filtered out such that aggregated usage data for a network page is user agnostic and data may not be used to identify a specific user or associated with the specific user. In other cases, some user data is collected so that network profiles may be associated with a group of users, such as users using a specific type of computing device to access the network page or users living in a particular geographic location.

Example Profile Generation Process

Figure 4:
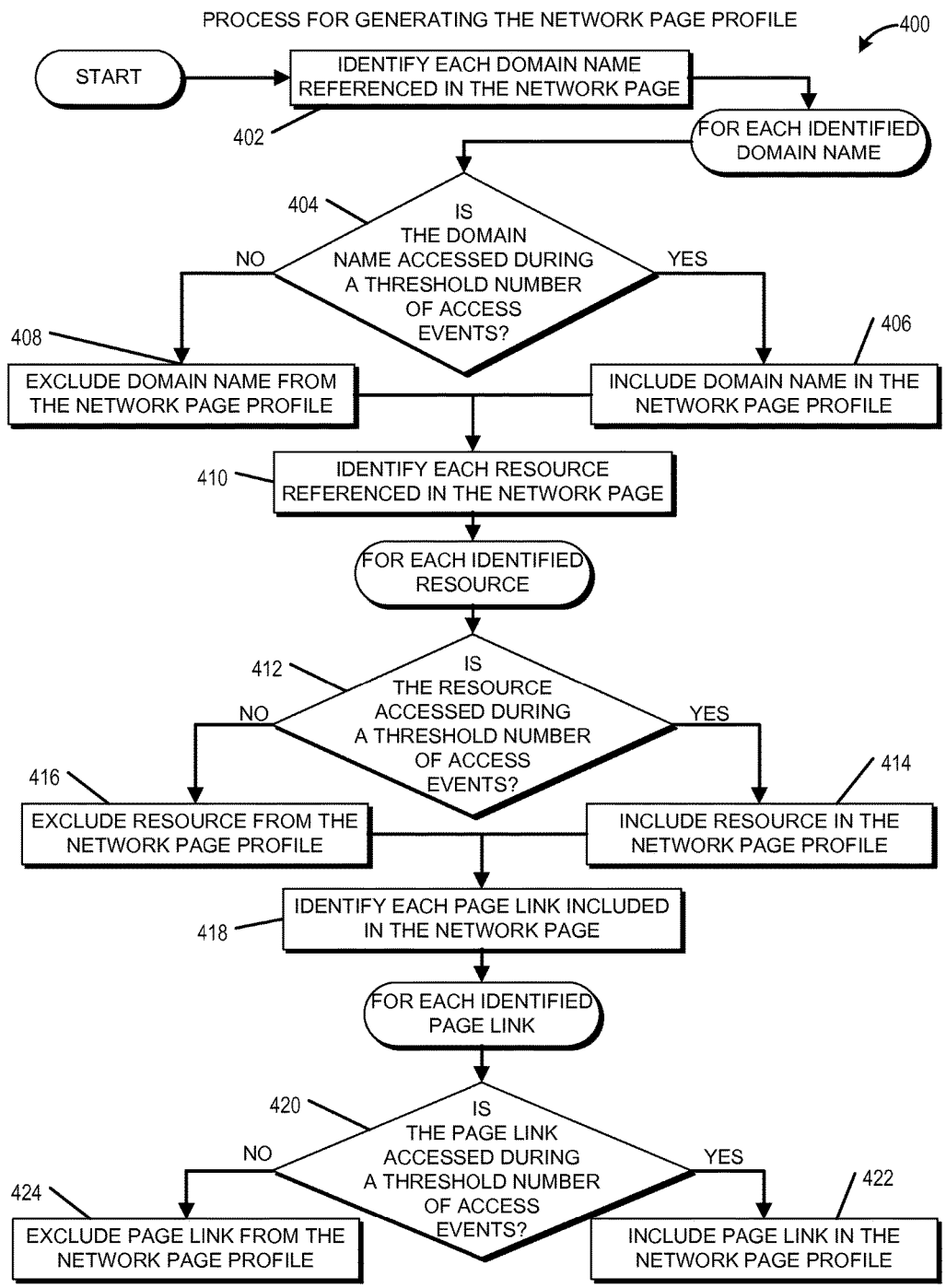
FIG. 4 presents a flowchart of an embodiment of a process for generating the network page profile.

FIG. 4 presents a flowchart of an embodiment of a process for generating the network page profile. The process 400 can be implemented by any system that can generate a network page profile for a network page. For example, the process 400, in whole or in part, can be implemented by a network computing component (e.g., the NCC 136), a profile generator 202, a data collection and reporting system 230, a browser 220, and the proxy server 208, to name a few. Although any number of systems, in whole or in part, can implement the process 400, to simplify discussion, the process 400 will be described with respect to particular systems.

The process 400 begins at block 402 where, for example, the profile generator 202 identifies each domain name referenced in the network page to be profiled. A network page may identify a number of domains. For example, in addition to the domain where the network page is hosted, the network page may include the identity of domains that host linked pages, network resources (e.g., videos), and the like.

For each identified domain name, the profile generator 202 determines at the decision block 404 whether the domain corresponding to the domain name is accessed during a threshold number or percentage of access events. Alternatively, the decision block 404 may include determining whether the domain corresponding to the domain name is accessed by a threshold number, or percentage, of users, or user devices, from a set of users or user devices (e.g., clients 102). In some cases, each access event is counted separately. In other cases, multiple access events from a specific user are treated as one access event. In some cases, the determination of whether the domain name is accessed during a threshold number of access events may be associated with a time period. Further, the profile generator 202 may make the determination based on the usage data associated with each user. In some cases, the profile generator 202 may determine the number or percentage of times an identified domain is accessed versus the number of times the network page is accessed. Further, each user's access of the domain name may be weighted based at least partially on the number or percentage of times an identified domain is accessed versus the number of times the network page is accessed. For example, if a user accesses the network page 100 times, but only accesses the identified domain name on one of those occasions, the user's access of the domain name may have a lower weighting than someone who accessed the identified domain name nine out of ten times. In cases where accesses to the domain name are weighted, the decision block 404 may determine whether the weighted number of times the domain name is accessed satisfies a threshold.

If the domain name is accessed by a threshold number, or percentage, of users from the set of users, the profile generator 202 includes the domain name, or a reference to the domain name, in the network page profile at block 406. In addition, in some cases, the profile generator 202 may include the number or percentage of users who accessed the domain name when the network page was accessed. On the other hand, if the domain name is not accessed by a threshold number, or percentage, of users from the set of users, the profile generator 202 excludes the domain name from the network page profile at block 408.

At block 410, the profile generator 202 identifies each resource referenced in the network page. In some cases, the profile generator 202 identifies only cacheable resources. However, in other cases, the profile generator identifies any resources referenced by the network page.

For each identified resource, the profile generator 202 determines at the decision block 412 whether the resource is accessed during a threshold number of percentage of access events. Alternatively, the decision block 412 may include determining whether the resource is accessed by a threshold number, or percentage, of users or user devices from the set of users or user devices. Some resources may be accessed automatically when a user accesses the network page. Other resources may require an action from a user. For example, a video resource may not be accessed until a user selects a button.

As with the determination at the block 404, the determination may be associated with a time period. Further, the determination may be made based on the usage data associated with each user. Moreover, as with the decision block 404, the determination may be made based on the number of times each resource is accessed by users versus the number of times the users access the network page. In addition, as with the decision block 404, each user's data may be weighted based on the times the user accessed the resource versus the number of times the user accessed the network page. This weighted access may then be aggregated among users and compared to the threshold at the decision block 412.

If the resource is accessed by a threshold number, or percentage, of users from the set of users, the profile generator 202 includes a reference to the resource in the network page profile at block 414. Further, as with the block 406, the profile generator 202 may include the number or percentage of users who accessed the resource when the network page was accessed. On the other hand, if the resource is not accessed by a threshold number, or percentage, of users from the set of users, the profile generator 202 excludes the resource from the network page profile at block 416.

At block 418, the profile generator 202 identifies each page link included in the network page. The page links may include links to additional network pages. For each identified page link, the profile generator 202 determines at the decision block 420 whether the page link is accessed during a threshold number or percentage of access events. Alternatively, the decision block 420 may include determining whether the page link is accessed by a threshold number, or percentage, of users or user devices from the set of users or user devices. Accessing the page link may include selecting and/or clicking the page link. The determination may be associated with a time period. Further as with the decision blocks 404 and 412, the determination may be made based on the number of times each page link is accessed by users versus the number of times the users access the network page. In addition, as with the decision blocks 404 and 412, each user's data may be weighted based on the times the user accessed the page link versus the number of times the user accessed the network page. This weighted access may then be aggregated among users and compared to the threshold at the decision block 420.

If the page link is accessed by a threshold number, or percentage, of users from the set of users, the profile generator 202 includes the page link in the network page profile at block 422. Further, as with the blocks 406 and 414, the profile generator 202 may include the number or percentage of users who accessed the page link when the network page was accessed. On the other hand, if the page link is not accessed by a threshold number, or percentage, users from the set of users, the profile generator 202 excludes the page link from the network page profile at block 424.

The thresholds associated with the decision blocks 404, 412, and 420 may be the same threshold. In other words, the threshold may be set such that at least 50% or 70% of access events or of users from the set of users must access a domain name, resource, or page link for the domain name, resource, or page link to be included in the network page profile. Alternatively, one or more of the decision blocks 404, 412, 420 may be associated with an independent threshold. For instance, in some cases, it may be more resource intensive to pre-fetch a resource than to resolve a domain name. In such cases, the threshold associated with including a reference to resource in the network page profile (e.g., the decision block 412) may be set higher than the threshold associated including a reference to a domain name (e.g., the decision block 404). Further, in some embodiments, the thresholds may differ based on a feature associated with the set of users. For example, thresholds may differ for a set of users who use mobile devices versus non-mobile devices.

In some embodiments, the network page profile may include references to any domain name, resource, and/or page link regardless of the number of users who accessed the domain names, resources, and/or page links. In such cases, the decision blocks 404, 412, and/or 420 may be omitted. Further, the blocks 408, 416, and/or 424 may be omitted. In addition, in such cases, the network page profile may include the number or percentage of users who accessed the domain names, resources, and/or page links enabling a system (e.g., the browser 220 or the NCC 136) to determine whether to pre-process domain names, resources, or page links as will be described in further detail with respect to FIG. 5. Further, in some such cases, an individual browser 220 or NCC 136 may determine a threshold for whether a domain name, resource, and/or page link should be pre-processed. Thus, different browsers 220 or NCCs 136 may set different thresholds generally, or for different client devices 102 and/or users.

In some embodiments, the process 400 may include associating a time-to-live value with the network page profile. In some such cases, when the time-to-live value associated with the network page profile is reached, the process 400 may be repeated with the set of users, another set of users, or over another time period (e.g., a more recent time period than the previous execution of the process 400), etc.

Further, in some embodiments, portions of the network page profile may be associated with a time-to-live value. In some such cases, when the time-to-live value associated with a portion of the network page profile is reached, a corresponding portion of the process 400 may be repeated and the network page profile may be updated. For example, a time-to-live value may be associated with the portion of the network page profile associated with the resources. The time-to-live value may be based on a time-to-live value associated with the resources by, for example, the content provider system 104. The content provider system 104 may associate the time-to-live value with the resources if the resources are identified as cacheable. In other cases, the time-to-live value may be associated with the resources by the profile generator 202 based on whether the resources were identified as cacheable, not cacheable, not specified, and/or based on settings by a user (e.g., an administrator).

When the time time-to-live value is met or expires, the portion of the process 400 associated with the resources of the network page (e.g., the blocks 410, 412, 414, and 416) may be repeated with or without performing the remainder of the process 400. In some cases, different time-to-live values may be associated with different portions of the network page profile because, for example, different features of a network page may change more or less frequently. Further, in some cases, each item (e.g., resource or page link) identified in the network page profile may be associated with its own time-to-live value. For example, a cacheable resource may be associated with a longer time-to-live value than a non-cacheable resource.

As previously stated with respect to FIG. 3, in some cases, the set of users may include a single user. This may occur, for example, if the process 400 is performed by the browser 220. In such cases, instead of determining whether a threshold number of users accessed a domain name, resource, and/or page link, the process 400 may determine whether the user accessed the domain name, resource, and/or page link a threshold number or percentage of times. In some cases, the process 400 may execute in response to the user, or set of users, accessing the network page a threshold number of times within a period of time.

In some embodiments, the process 400 may be performed with respect to one or more of the domain names, resources, and/or page links, but not necessarily all three. In such cases, corresponding portions of the process 400 may be optional. For example, if the profile generator examines domain names and resources, but not page links, the blocks 418, 420, 422, and 424 may be optional.

In some embodiments, the processes 300 and 400 may be performed by a system that hosts the network page. For example, the content provider system 104 may perform the processes 300 and 400.

Example Network Page Access Process

Figure 5:
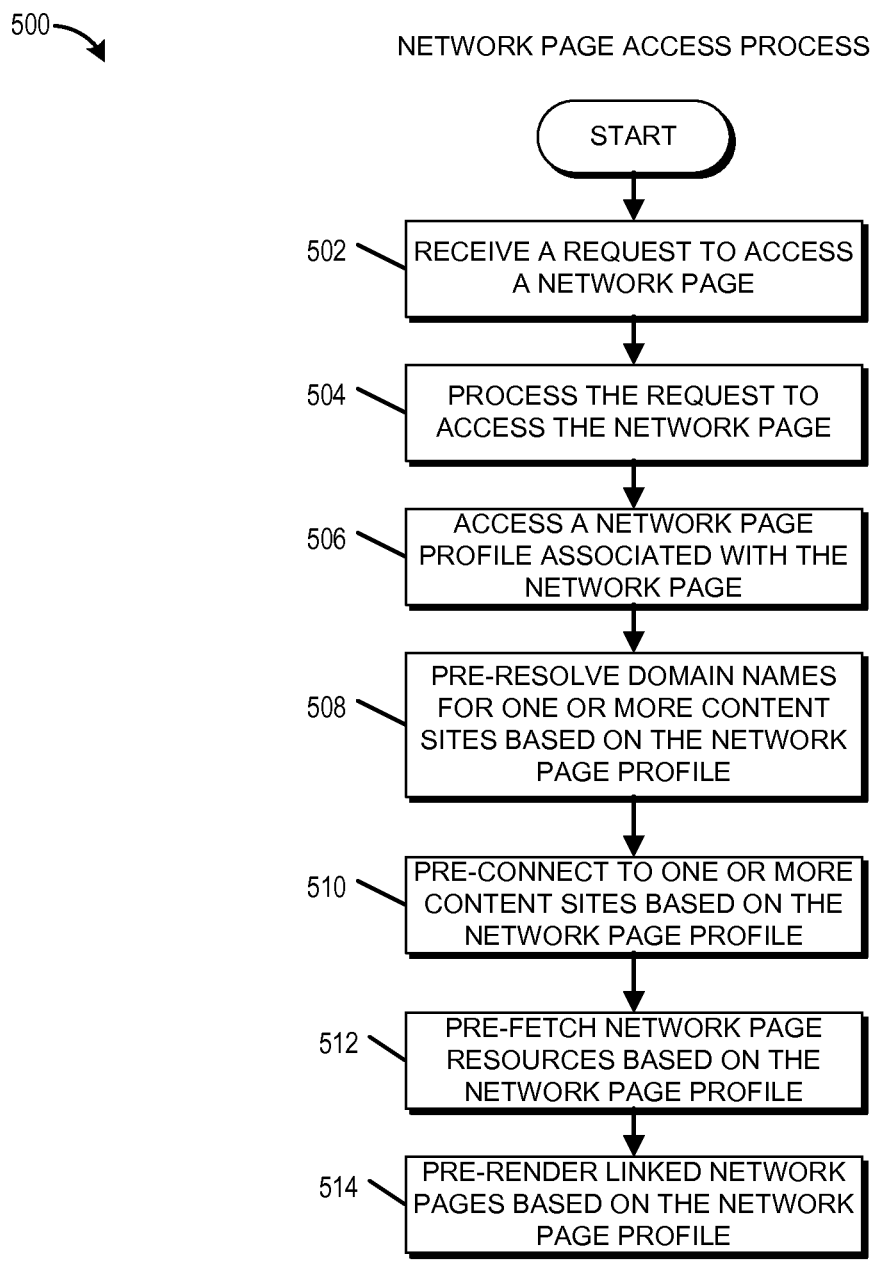
FIG. 5 presents a flowchart of an embodiment of a network page access process.

FIG. 5 presents a flowchart of an embodiment of a network page access process 500. The process 500 can be implemented by any system that can access or facilitating accessing a network page using a network page profile. For example, the process 500, in whole or in part, can be implemented by a network computing component (e.g., the NCC 136), the proxy server 208, the pre-fetch system 204, the pre-connection system 206, the DNS resolution system 208, the pre-fetch system 226, the pre-connection system 232, and the DNS resolution system 228, to name a few. Although any number of systems, in whole or in part, can implement the process 500, to simplify discussion, the process 500 will be described with respect to particular systems.

The process 500 begins at block 502 where, for example, the NCC 136 receives a request to access a network page. The request may be received from an application configured to access network pages at a user computing system (e.g., the client 102). For example, the request may be received from the browser 220 or from a mobile application (e.g., an "app") (not shown) at the client 102. In some cases, the request may be received by a proxy service at the NCC 136, such as at the proxy server 210. Moreover, the block 502 may be optional. For example, in some cases, the process 500 may be performed for frequently accessed pages, such as pages that are accessed more than a threshold number of times.

At block 504, the NCC 136 processes the request to access the network page. Processing the request can include any procedure for accessing the network page and providing the requesting system (e.g., the client 102) or an application (e.g., the browser 220) on the requesting system with access to the network page. For example, the block 504 may include providing a request to access the network page to the content provider system 104, receiving the network page from the content provider system 104 in response to the request, and providing the received network page to the client 102. Further, the block 504 may include accessing resources referenced by the network page from additional systems, such as from the CDN service provider system 106. Generally, although not necessarily, the resources accessed at the block 504 are resources provided or displayed as part of the default or initial access of the network page. In other words, in some such cases, no additional action is required by a user or system to cause the resources to be displayed when the network page is requested.

At block 506, the NCC 136 accesses a network page profile associated with the network page. The network page profile may be accessed from a storage system, such as the storage 140. Alternatively, or in addition, the network page profile may be received from the profile generator 202. In some cases, the network page profile may be received from the content provider system 104. In some embodiments, a network page may be associated with multiple network page profiles. In such cases, the network page profile accessed at the block 506 may be selected based on the user or a classification associated with the user. For example, the network page profile may be selected based on the user's location or the user computing device used by the user to provide the request at the block 502. As previously described, in certain embodiments, the network page profile is based on aggregate behavior from a number of access events, users, and/or client devices 102.

The DNS resolution system 208, pre-resolves one or more domain names for one or more content sites based on the network page profile at block 508. Pre-resolving the one or more domain names may include accessing domain names, or references to domain names, included in the network page profile and providing the domain names, or references to domain names, to a system for resolving the domain names, such as the DNS server 234. In some cases, the DNS resolution system 208 pre-resolves domain names included in the network page profile that are associated with a confidence or probability satisfying a threshold that the user will access the domain name. Advantageously, in certain embodiments, by pre-resolving the domain names, the time required to access a resource or another network page at the domain name is reduced.

At block 510, the pre-connection system 206 pre-connects to one or more content sites based on the network page profile. Pre-connecting to the one or more content sites may include accessing references to content sites included in the network page profile and forming connections to the one or more referenced content sites. The formed connections can be any type of connection used to communicate information between computing system. For example, the connections may be TCP connections. In some cases, the pre-connection system 206 pre-connects to content sites referenced in the network page profile that are associated with a confidence or probability satisfying a threshold that the user will access the domain name. The content sites may include an origin server 112, web server 110, or application server at the content provider system 104. Further, in some cases, the content sites to which the pre-connection system 206 pre-connects may include CDNs configured to store resources for one or more content sites. Advantageously, in certain embodiments, by pre-connecting to content sites, the time required to access a resource or another network page at the content site is reduced.

At block 512, the pre-fetch system 204 pre-fetches one or more network page resources based on the network page profile. Pre-fetching one or more network page resources (e.g., images, videos, JavaScript) may include accessing references to the network page resources included in the network page profile and obtaining copies of the referenced network page resources from, for example, the content provider system 104 or the CDN service provider system 106. These copies may then be stored at, for example, the storage 140. In some cases, the pre-fetch system 204 pre-fetches network page resources referenced in the network page profile that are associated with a confidence or probability satisfying a threshold that the user will access the domain name. The pre-fetched network page resources may be stored at the storage 140 or provided to the browser 220. The browser 220 may store the pre-fetched resources at its cache 222, or at a pre-fetch cache 224 for storing pre-fetched resources. Advantageously, in certain embodiments, by pre-fetching resources, the time required to access a resource or another network page at the content site is reduced.

In some embodiments, a time-to-live (TTL) value may be associated with the pre-fetched resource. For example, if the resource is identified as a cacheable resource, a TTL value may be included with the resource. The pre-fetch system 204 may determine the TTL value associated with the pre-fetched resource and store it with the pre-fetched resource at, for example, the pre-fetch cache 224. Alternatively, the pre-fetch system 204 may generate a TTL value to include with the resource. The generated TTL value may be based on a TTL value associated with the resource if such a value exists. In some cases, when, for example, the resource is not a cacheable resource, the pre-fetch system 204 may generate a TTL value based on the lack of TTL value associated with the resource. In certain embodiments, because, for example, the resource is not a cacheable resource, the generated TTL value may be relatively short compared to a TTL value of a cacheable resource. For example, the TTL value may be 30 seconds for a non-cacheable resource versus 2 days for a cacheable resource.

At block 514, the browser 220 pre-renders linked network pages based on the network page profile. Pre-rendering one or more linked network pages may include accessing references (e.g., page links, such as HTML links) to the linked network pages included in the network page profile, accessing the linked network pages, and pre-rendering at least a portion of the linked network pages. The pre-rendered network pages, or portions thereof, may be rendered in a tab of the browser 220 that is not currently displayed to the user. Upon the user selecting the link, the tab can be presented to the user and, if not fully rendered, the remainder of the network page may be rendered. Alternatively, a linked network page may be pre-rendered in memory of the client 102 and presented to the user upon selection of a corresponding page link. As another alternative, the linked network page may be pre-rendered at the NCC 136. In such cases, the pre-rendered network page may be stored at the storage 140. Further, the pre-rendered network page may be streamed to the browser 220 upon selection of the corresponding page link from the network page. Although described with respect to linked network pages, in some embodiments, the block 514 may include pre-rendering additional network pages that are associated with a threshold probability of being accessed by a user who accesses the network page associated with the network page profile regardless of whether the additional network pages are linked to the network page.

In some cases, the browser 220 pre-renders linked network pages referenced in the network page profile that are associated with a confidence or probability satisfying a threshold that the user will access the linked network pages. Advantageously, in certain embodiments, by pre-rendering network pages, the time required to access a network page at the content site is reduced.

In some embodiments, the number of domains pre-resolved, content sites pre-connected, resources pre-fetched, and/or network pages pre-rendered may be based on computing resources available to the client 102, at the NCC 136, or associated with a user at the NCC 136. Thus, in some cases, although a network page profile may include ten resources, it is possible that five will be pre-fetched. In some such cases, the domains pre-resolved, content sites pre-connected, resources pre-fetched, and/or network pages pre-rendered may be based on a probability value associated with the domains pre-resolved, content sites pre-connected, resources pre-fetched, and/or network pages pre-rendered. Thus, continuing the previous example, if only five of ten resources are pre-fetched, the five selected resources may be the five resources associated with the highest probability of being accessed by a user who accesses the network page.

Moreover, in some embodiments, one or more of the blocks 508, 510, 512, and 514 may be omitted. For example, in some cases, a network page profile may list network resources, but exclude references to linked network pages.

Although the process 500 has primarily been described as being performed by systems associated with the NCC 136, in some embodiments, the process 500 may be performed by systems associated with the client 102. For example, upon accessing a network page, via the NCC 136 or proxy server 210, or by communicating with the content provider system 104, the client 102 may receive the network page profile associated with the network page. Alternatively, the client 102 may generate the network page profile. The block 508 can then be performed by the DNS resolution system 228. Further, the block 510 may be performed by the pre-connection system 232 and the block 512 may be performed by the pre-fetch system 226.

As previously indicated, in certain embodiments, the process 500 may be used to pre-render network pages, or portions thereof. In some cases, pre-rendering a network page may include transforming the format of the network page to another format. For example, if a particular network page includes a large number of images (e.g., more than 15, 20, or 100 images), pre-rendering the particular network page may include transforming the network page to present an alternative image-flow view, which in some cases may be selected based on the client device 102.

As a second example of transforming the format of a network page, pre-rendering a particular network page may include pre-rendering the network page in a "reading mode" view. This reading mode view may include a view that renders a portion of a network page that primarily comprises text while excluding other content or resources, such as images, advertisements, videos, etc. In some cases, the reading mode view may include enhancing or enlarging the text-portion. The browser 220, for example, may identify a linked network page at the block 514 that a user is likely to access based on the network page profile and determine whether the linked network page is a good candidate for display in the reading mode view based, for example, at least partially on the content of the network page. In addition, or alternatively, the browser 220 may determine whether the linked network page is a good candidate for display in a reading view mode based at least partially on whether a threshold number or percentage of users who accessed the linked network page viewed the linked network page in a reading view mode. If the browser 220 determined that the linked network page is a good candidate for display in a reading view mode, the browser 220, or other pre-rendering system, may pre-render the linked network page in a reading new mode at the block 514. Further embodiments of a reading view mode that may be used with certain embodiments herein are described in U.S. application Ser. No. 13/633,751 filed on Oct. 2, 2012 and titled "EFFICIENT IDENTIFICATION OF ARTICLE TEXT IN CONTENT PAGES," which is hereby incorporated by reference in its entirety herein.

The process 500 may, in certain embodiments, be used to present a user with recommendations of additional network pages. For instance, in generating the network page profile associated with a network page, the profile generator 202 may determine whether a threshold number or percentage of users accessed another network page, which may or may not be linked to the network page with the network page profile. If so, the profile generator 202 may include the identity of the additional network page in the network page profile of the network page. In such embodiments, the NCC 136 may recommend the user view the additional network page in response to receiving the request to access the network page. Further, the additional network page may be pre-rendered as part of the block 514.

Further, in certain embodiments, the profile generator 202 may identify a topic of the network page or of an article, or other content, included in the network page. In such embodiments, the profile generator 202 may also identify other network pages and/or articles that may be of interest to a user who accesses the network page based at least partially on the topic of the network page and/or on other network pages or articles that users who accessed the network page also accessed. In some such embodiments, the profile generator 202 may recommend the user view the additional network pages and/or articles in response to receiving the request to access the network page. Additionally, one or more of the blocks 508, 510, 512, and 514 may be performed with respect to the additional network pages and/or articles. For example, one or more domain names associated with the additional network pages and/or articles may be pre-resolved at block 508. Embodiments of processes and systems for identifying additional articles and/or content that may be recommended to a user using certain embodiments disclosed herein are disclosed in U.S. application Ser. No. 13/736,882 filed Jan. 8, 2013 and titled "ARCHITECTURE FOR PROVIDING UPDATED TOPICAL CONTENT" U.S. application Ser. No. 13/736,880 filed Jan. 8, 2013 and titled "ARCHITECTURE FOR PROVIDING TIMELINES OF TOPICAL CONTENT," the disclosures of which are hereby incorporated by reference in their entirety herein.

Example Network Page Profile

FIG. 6 presents an embodiment of a network page profile 600. The network page profile 600 is one non-limiting example of a network page profile. The network page profile 600 can be written or generated using any format or language that can be understood by a system for accessing a network page or associated resource including, for example, one or more of the NCC (e.g., the NCC 136), the pre-fetch system 204, the pre-connection system 206, the DNS resolution system 208, the pre-fetch system 226, the pre-connection system 232, the DNS resolution system 228, and/or the browser 220. For instance, the network page profile may be written in a markup language, such as XML or HTML, as a text file, as a spreadsheet, as a word processing file, as JavaScript, etc. Further, the network page profile may include more or less information than the example of the network page profile 600.

In the example presented in FIG. 6, the network page profile 600 is associated with the network page "www.examplenetworkpage.com." Further, the network page profile 600 may include a page links section 602, a network resource references section 604, and a domain references section 606. The page links section 602 can include one or more network page links included on the network page. Further, in some cases, the page links section 602 may include a probability that a user will select the network page link. For example, as illustrated in FIG. 6, the network page may include a page link to "www.examplenetworkpage.com/page3," which may be associated with a probability of 0.9, or 90%. As previously described, the probability of a user selecting the network page link may be based on usage data for other users who have accessed the network page, or for the user based on the user's previous access of the network page.

The network resource references section 604 may include references to resources that may be accessed by a user who accesses the network page. Although not shown, in some cases, the network resource references section 604 may also include a probability value for each network resource indicating the probability that a user accessing the network page accesses the network resource. In addition, as shown in FIG. 6, the network resource references section 604 may identify whether each referenced resource is cacheable.

The domain references section 606 may include lists of or references to domains that serve responses or provide resources for the network page. Although not shown, in some cases, the domain references section 606 may also include a probability value for each identified domain indicating the probability that a user accessing the network page accesses the domain.

As illustrated in FIG. 6, at least some of the page links, resources, and/or domains may be associated with a timestamp 608. The timestamp 608 may be used to determine whether the portion of the network page profile associated with a page link, resource and/or domain has expired. As previously described, in some cases, one or more of the page links, resources, and/or domains may be associated with a time-to-live value instead or, or in addition to, the timestamp 608.

Terminology

A number of computing systems have been described throughout this disclosure. The descriptions of these systems are not intended to limit the teachings or applicability of this disclosure. For example, the network computing component 136 described herein can generally include any computing device(s), such as desktops, laptops, servers, and distributed computing systems, to name a few. As a second example, the client devices 102 can generally include any computing device(s), such as desktops, laptops, servers, video game platforms, television set-top boxes, televisions (e.g., internet TVs), computerized appliances, and wireless mobile devices (e.g. smart phones, PDAs, tablets, electronic book readers, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the network computing component 136 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, operation, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A system for generating a network page profile, the system comprising:
a network computing component comprising one or more hardware processors, the one or more hardware processors executing instructions that:
collect usage data from a plurality of user devices, the usage data reflective of accesses to a network page by the plurality of user devices;
for each user device from the set of user devices, access usage data associated with the user device, the usage data corresponding to the user device's access of the network page; and
generate a network page profile for the network page based at least partially on the usage data accessed for each user device from the set of user devices, the network page profile including at least a reference to a domain name referenced by the network page, wherein generating the network page profile comprises:
identifying a network page feature, the network page feature comprising a cacheable network resource included in the network page; and
determining whether a threshold amount of user devices from the set of user devices accessed the network page feature during a time period; and
a network page access system executed by one or more hardware processors executing instructions that:
access the network page using the network page profile, wherein the network page profile enables the network page access system to perform at least one network page access task preemptively; and
pre-fetch the cacheable network resource based at least in part on determining (1) from the network page profile that at least the threshold amount of user devices accessed the cacheable network resource, and (2) that a time-to-live value associated with the cacheable network resource has not been reached.

2. The system of claim 1, wherein the network computing component further executes instructions that associate the time-to-live value with the cacheable network resource.

3. The system of claim 2, wherein the network computing component further executes instructions that update at least the portion of the network page profile in response to the time-to-live value expiring.

4. The system of claim 1, wherein the network computing component comprises the network page access system.

5. The system of claim 1, wherein the network page access system is included with a user computing system.

6. The system of claim 1, wherein the network computing component further executes instructions that select the plurality of user devices from which to collect usage data based at least partially on a location of each user device.

7. The system of claim 1, wherein the network computing component further executes instructions that select the plurality of user devices from which to collect usage data based at least partially on a type of each user device.

8. The system of claim 1, wherein the network page access system comprises a browser.

9. The system of claim 1, wherein the network page access system comprises a proxy service.

10. The system of claim 1, wherein the network page access system further executes instructions that receive a request to access the network page and in response to the request, pre-resolve a domain name identified in the network page profile.

11. The system of claim 1, wherein the network page access system further executes instructions that receive a request to access the network page and in response to the request, pre-connect to a content site identified in the network page profile.

12. The system of claim 1, wherein the network page feature comprises the domain name referenced in the network page and in response to determining that the threshold amount of user devices from the set of user devices accessed the network page feature, including a reference to the network page feature in the network page profile.

13. The system of claim 1, wherein the network page feature comprises a resource referenced in the network page and in response to determining that the threshold amount of user devices from the set of user devices accessed the network page feature, including a reference to the network page feature in the network page profile.

14. The system of claim 1, wherein the network page feature comprises a network page link referenced in the network page and in response to determining that the threshold amount of user devices from the set of user devices accessed the network page feature, including a reference to the network page feature in the network page profile.

15. The system of claim 1, wherein the network computing component further weights the usage data of each user device based at least in part on a percentage of times the user device accesses the domain name versus the network page.

16. Non-transitory physical computer storage comprising instructions stored thereon that, when executed by one or more processors, implement a system for generating a network page profile, the system comprising:
a network computing component that:
identifies a first user who accessed a network page;
accesses usage data associated with the first user, the usage data corresponding to the first user access of the network page;
generates a network page profile for the network page based at least partially on the usage data and aggregate usage data associated with one or more additional users who access the network page, the network page profile including at least a reference to a domain name referenced by the network page, wherein generating the network page profile comprises:
identifying a network page feature comprising a cacheable network resource; and
determining whether a threshold number of users from the one or more additional users accessed the network page feature during a time period;
pre-fetching the cacheable network resource based at least in part on determining (1) that at least the threshold amount of user devices accessed the cacheable network resource, and (2) that a time-to-live value associated with the cacheable network resource has not been reached; and in response to receiving a request to access the network page, accessing the network page based on the network page profile.

17. The non-transitory physical computer storage of claim 16, wherein the request to access the network page is received from a user computing system associated with a second user.

18. A method of generating a network page profile, the method comprising:
by a network computing component comprising one or more processors:
aggregating usage data reflective of accesses by a plurality of user devices to a network page;
generating a network page profile for the network page based at least partially on the aggregated usage data, the network page profile including at least a reference to a domain name referenced by the network page, wherein generating the network page profile comprises:
identifying a network page feature comprising a cacheable network resource included in the network page; and
determining whether a threshold amount of user devices from the plurality of user devices accessed the network page feature during a time period; and
pre-fetching the cacheable network resource based at least in part on determining (1) from the network page profile that at least the threshold amount of user devices accessed the cacheable network resource, and (2) that a time-to-live value associated with the cacheable network resource has not been reached.

19. The method of claim 18, further comprising performing at least one page generation task comprising at least one of:
pre-resolving the domain name referenced in the network page profile in response to a request to access the network page; and
pre-connecting to a content site identified in the network page profile in response to the request to access the network page.

20. The method of claim 18, further comprising performing at least one page generation task comprising transforming a format of a second network page identified in the network page profile to a second format, the second network page referenced by the network page.

21. The method of claim 18, wherein aggregating usage data reflective of accesses to the network page comprises aggregating usage data of accesses to the network page by a plurality of user devices.

22. The method of claim 18, wherein the network page feature comprises the domain name referenced in the network page and in response to determining that the network page feature has been accessed by the threshold amount of user devices, including a reference to the network page feature in the network page profile.

23. The method of claim 18, wherein the network page feature comprises a resource referenced in the network page and in response to determining that the network page feature has been accessed by the threshold amount of user devices, including a reference to the network page feature in the network page profile.

24. The method of claim 18, wherein the network page feature comprises a network page link referenced in the network page and in response to determining that the network page feature has been accessed by the threshold amount of user devices, including a reference to the network page feature in the network page profile.

* * * * *